United States Patent Office 3,259,232
Patented July 5, 1966

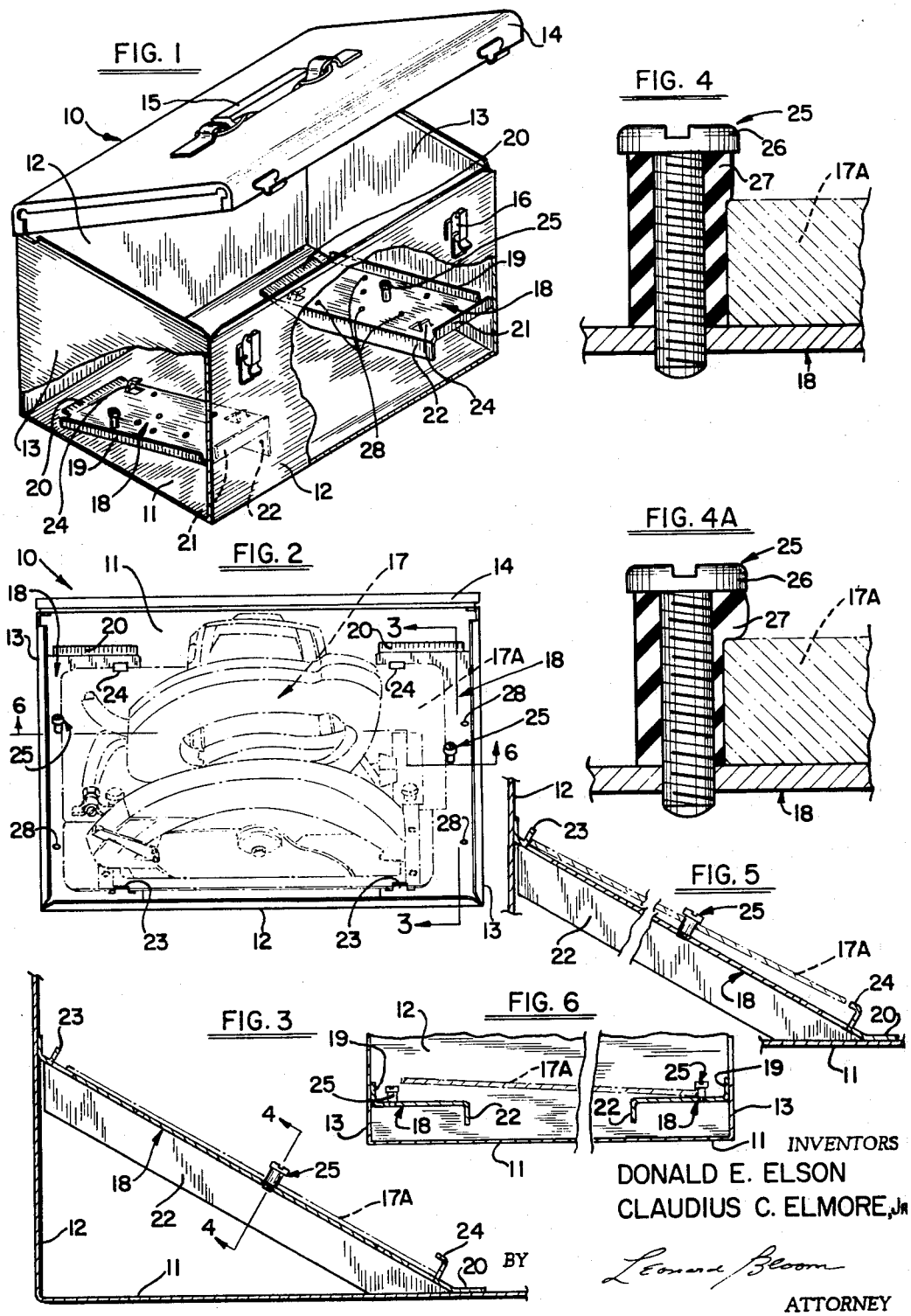

3,259,232
KIT BOX WITH IMPROVED MEANS FOR RETAINING A PORTABLE POWER-OPERATED SAW OR OTHER TOOL
Donald E. Elson, Baltimore, and Claudius C. Elmore, Jr., Timonium, Md., assignors to The Black and Decker Manufacturing Company, Towson, Md., a corporation of Maryland
Filed Sept. 1, 1964, Ser. No. 393,522
6 Claims. (Cl. 206—16)

The present invention relates to a kit box for a portable power-operated saw or other tool, and more particularly, to an improved means for retaining the saw within the box.

It is an object of the present invention to prevent any substantial movement or chattering of the saw within the box as the box is carried or transported from place to place.

It is a further object to reduce the overall required size of the box to a minimum by inclining the saw in its supported position within the box.

In accordance with the broad teachings of the present invention, there is herein illustrated and described, a kit box having improved means for retaining therein a portable power-operated saw or like tool, one having a substantially-flat shoe plate; and this improved means comprises a shelf secured within the box, preferably in spaced relation to the bottom of the box, for supporting the shoe plate or the saw, in combination with a pair of headed bumpers secured at respective ends of the shelf for engaging respective parallel edges of the shoe plate. The headed bumpers retain the shoe plate against substantial movement vertically and in the plane of the shelf, and at least one of the bumpers is provided with a resilient member about its body portion. In order to lift the saw out of the box, the saw is moved so that an edge of its shoe plate compresses the resilient member of the one bumper, thereby enabling the shoe plate to be pivoted or slightly tilted about the one bumper, and thereby enabling the opposite parallel edge of the shoe plate to clear the other of the bumpers.

Preferably, the shelf means comprises a pair of spaced-apart supporting shelves, one each secured within the box and disposed at a respective end of the bottom of the box; and each shelf is preferably inclined by an acute angle with respect to the bottom of the box, such that the saw may be supported and retained in an inclined position within the box for a minimum of required space, and accordingly, the smallest size box for a given saw. The bumpers engage the respective parallel end edges of the shoe plate; and preferably, the bumpers are identical, with each of the bumpers comprising a resilient sleeve or bushing and a headed screw passing through the bushing and secured to the shelf. Moreover, means are provided to retain the shoe plate in the transverse direction; and preferably, this means comprises at least one lanced-out raised tab (formed on one of the side edges of the shelf) and at least one lanced-out raised hook formed on the opposite edge, the hook and tab cooperating with the respective parallel side edges of the shoe plate. Since the supporting shelf (or shelves) is inclined, the tab is preferably formed on the top of the incline, and the hook on the bottom, such that the weight of the saw on the inclined shelf tends to maintain the hook in engagement with its respective side edge of the shoe plate for the saw.

These and other objects of the present invention will become apparent from a reading of the following specification, taken in conjunction with the enclosed drawings, in which:

FIGURE 1 is a perspective of the kit box of the present invention, with part of the side wall and part of the end wall of the box being broken away to illustrate the improved means for retaining the saw within the box;

FIGURE 2 is a top plan view of the kit box with the hinged lid being in its open position, the broken lines illustrating a typical portable electric saw, and the view showing the manner in which the shoe plate of the saw is supported and retained within the box;

FIGURE 3 is a section view, taken along the lines 3—3 of FIGURE 2, enlarged over the scale of FIGURE 2, showing the inclined position of the supporting shelf, and further showing a headed bumper, a hook, and a tab;

FIGURE 4 is a view taken along the lines 4—4 of FIGURE 3, enlarged over the scale of FIGURE 3, and showing the manner in which one of the headed bumpers (with its resilient bushing) engages a respective one of the parallel end edges of the shoe plate for the saw;

FIGURE 4a corresponds substantially to that of FIGURE 4, but illustrates the manner in which the shoe plate of the saw may be manually depressed against one of the resilient bushings to enable the opposite end of the shoe plate to clear the other of the bumpers;

FIGURE 5 illustrates the manner in which the shoe plate is first moved in the transverse direction up the inclined shelf to first clear the shoe plate from the lanced-out raised hook; and FIGURE 6 is a schematic view, taken along the lines 6—6 of FIGURE 2, and illustrating the manner in which the shoe plate is then moved longitudinally to compress the resilient bushing of one of the bumpers, as in FIGURE 4a, to thereafter enable the shoe plate to be pivoted or tilted slightly to clear the other of the headed bumpers.

With reference to FIGURE 1, there is illustrated a kit box 10 with which the teachings of the present invention may find particular utility. The box 10 is of conventional construction and generally comprises a bottom 11, side walls 12, end walls 13, a hinged lid 14, a handle 15 by means of which the kit box may be carried from place to place, and suitable latches 16 for retaining the lid on the box. This type of kit box is widely used for enclosing a portable electric saw 17 or other tool.

With further reference to FIGURES 2 and 3, a shelf means, preferably comprising a pair of spaced-apart parallel shelves 18, is disposed on the bottom of the box. Preferably, the shelves 18 are economically formed as stamped-out bent sheet metal parts, and each of the shelves has a flange 19 secured (as by welding) to end wall 13 of the box, a flange 20 secured to the bottom 11 of the box, a flange 21 secured to the front side wall 12, and a strengthening flange 22 to provide greater rigidity to the shelf. In the specific embodiment shown, the shelves 18 are spaced apart with respect to each other so as to provide an additional storage area intermediately thereof; however, one continuous shelf could be provided if desired.

Preferably, each of the shelves, see FIGURES 1 and 3, is inclined by an acute angle with respect to the bottom of the box, and this enables the saw 17 to be supported and retained in an inclined position within the box in a minimum of required space, thereby enabling the kit box 10 to be manufactured in as small a size as possible.

A lanced-out raised tab 23 is formed near one of the side edges of each shelf, and a lanced-out raised hook 24 is formed near the opposite edge of the shelf. As shown more particularly in FIGURES 2 and 3, the combination of the inclined position of the shelf with the respective tabs 23 and hooks 24, provides a means for preventing a substantial movement of the shoe plate 17a of the saw in a transverse direction relative to the box.

A pair of headed bumpers 25 are preferably secured, one per shelf, near opposite ends of the box; and the headed bumpers 25 engage the respective parallel end edges of the shoe plate 17a of the saw for retaining the shoe plate longitudinally and vertically relative to the box. Preferably, the headed bumpers 25 are identical, with each comprising a resilient sleeve or bushing 26 and a headed screw 27, preferably of the self-tapping type, passing through the bushing and secured to its respective shelf as shown in FIGURE 4.

The preferred manner in which the saw 17 is removed from the box 10 is shown more clearly in FIGURES 5 and 6. Preferably, the saw is manually moved (slightly) in the transverse direction (up the incline of the shelf) such that one of the parallel side edges of the shoe plate 17a of the saw is lodged near or against the tabs 23, see FIGURE 5, with sufficient clearance then being provided between the opposite side edge of the shoe plate and the engaging hooks 24. Thereafter, and as shown in FIGURE 6, the saw is manually moved (slightly) in the longitudinal direction against one or the other of the headed bumpers 25, so that the one bumper, see FIGURE 4a, is compressed slightly by the shoe plate; and this enables the shoe plate to be tilted or pivoted slightly about the one bumper and the opposite end edge of the shoe plate 11a to clear the other of the bumpers, thereafter allowing the saw to be lifted vertically out of the box.

If desired to do so, the dimensions between the respective tabs and hooks and the compressibility of the bumpers may be such that the saw could be moved longitudinally first and then transversely to enable the saw to be lifted out of the box. Also, the positioning of the bumpers and the cooperating tabs and hooks could be reversed, that is to say, one set could be provided in the transverse direction and the other in the opposite direction from that which is illustrated in the drawings.

Moreover, a number of holes 28, see FIGURE 1, are provided in the respective shelves 18; and this enables additional headed bumpers (not shown, but preferably similar in construction to that which is illustrated in FIGURE 4) to be secured to the shelves and to substitute for the cooperating tabs and hooks in the event that the kit box is used to house a saw having a smaller shoe plate.

Obviously, many modifications may be made without departing from the basic spirit of the present invention; and accordingly, within the scope of the appended claims, the invention may be practiced other than has been specifically described herein.

We claim:

1. In a kit box a portable power-operated saw having a substantially-flat shoe plate, the improvement in means to retain the saw within the box, which comprises:
   (a) shelf means secured within the box, whereby the shoe plate of the saw is supported on said shelf means;
   (b) a pair of headed bumpers secured at respective ends of said shelf means and engaging respective parallel edges of the shoe plate retaining the shoe plate longitudinally and vertically relative to said shelf means;
   (c) at least one of said bumpers being provided with resilient means about its body portion;
   (d) means engaging the respective parallel side edges of the shoe plate preventing substantial movement of the shoe plate in the transverse direction; and
   (e) whereby to lift the saw out of the box, the shoe plate is moved transversely to disengage said last-named means and longitudinally to compress said resilient means of said one bumper to enable the shoe plate to be slightly tilted and thereafter to clear the other of said bumpers.

2. The combination of claim 1, wherein said shelf means comprises:
   (a) a pair of spaced-apart supporting shelves, one each secured at a respective end of the bottom of the box; and
   (b) said shelves each being inclined by an acute angle with respect to the bottom of the box; and
   (c) whereby the saw is supported and retained in an inclined position within the box for a minimum of required space.

3. The combination of claim 1, wherein said means retaining the shoe plate in the transverse direction, comprises:
   (a) at least one lanced-out raised tab formed on one of the side edges of said shelf means; and
   (b) at least one lanced-out raised hook formed on the opposite parallel edge of said shelf means.

4. In a kit box a portable power-operated saw having a substantially-flat shoe plate, the improvement in means to retain the saw within the box, which comprises:
   (a) shelf means secured within the box, whereby the shoe plate of the saw is supported on said shelf means;
   (b) a pair of bumpers, one at each end of said shelf means engaging respective parallel edges of the shoe plate retaining the shoe plate longitudinally and vertically relative to said shelf means;
   (c) each of said bumpers comprising a resilient bushing and a headed screw passing through said bushing and secured to said shelf means; and
   (d) means on said shelf means engaging the respective parallel side edges of the shoe plate preventing substantial movement of the shoe plate in the transverse direction; and
   (e) whereby to lift the saw out of the box, the shoe plate is moved transversely to disengage said last-named means and longitudinally to compress the respective resilient bushing on one of said bumpers to enable the shoe plate to be slightly tilted and thereafter to clear the other of said bumpers.

5. In a kit box a portable power-operated saw having a substantially-flat shoe plate, the improvement in means to retain the saw within the box, which comprises:
   (a) a shelf secured in spaced relation to the bottom of the box supporting the shoe plate of the saw;
   (b) said shelf being inclined by an acute angle with respect to the bottom of the box, whereby the saw is disposed in an inclined position within the box for a minimum of required space;
   (c) first means retaining the shoe plate of the saw against substantial movement vertically of the box; and
   (d) second means resiliently retaining the shoe plate of the saw against substantial movement in the plane of said shelf; and
   (e) said last-named means being selectively counteracted by a deliberate manual pressure applied to the saw in the plane of said shelf to enable the shoe plate to clear said first and second means and to thereafter enable the saw to be lifted vertically out of the box.

6. In a kit box a portable power-operated saw having a substantially-flat shoe plate, the improvement in means to retain the saw within the box, which comprises:
   (a) a shelf secured within the box supporting the shoe plate of the saw thereon; and
   (b) a pair of headed bumpers, one at each end of said shelf, respectively engaging a pair of parallel edges of the shoe plate of the saw preventing substantial movement of the shoe plate in the vertical direction; and (c) at least one of said bumpers having a resilient member intermediate its respective headed portion and the top of said shelf; and (d) whereby, to lift the saw out of the box, the saw is manually moved so that its shoe plate compresses said resilient member on the one bumper and thereby allows the shoe plate to be tilted slightly so that its opposite parallel edge clears the respective headed portion of the other bumper, thereafter allowing the saw to be lifted out of the box.

No references cited.

LOUIS G. MANCENE, *Primary Examiner.*